United States Patent [19]

Fast

[11] 4,064,938
[45] Dec. 27, 1977

[54] WELL SCREEN WITH EROSION PROTECTION WALLS

[75] Inventor: Clarence R. Fast, Tulsa, Okla.

[73] Assignee: Standard Oil Company (Indiana), Chicago, Ill.

[21] Appl. No.: 648,357

[22] Filed: Jan. 12, 1976

[51] Int. Cl.² ............................................. E21B 43/08
[52] U.S. Cl. .................................. 166/236; 210/460; 210/456
[58] Field of Search .................. 166/242, 244 C, 227, 166/230, 234, 235, 236, 205, 74, 228, 229, 231–233, 56, 105.1; 210/456, 497, 459–463; 175/314; 37/57; 29/163.5 CW, 163.5 F

[56] References Cited

U.S. PATENT DOCUMENTS

| | | | |
|---|---|---|---|
| 717,420 | 12/1902 | Lesson | 166/230 |
| 1,305,915 | 6/1919 | Mack | 166/236 |
| 1,652,650 | 12/1927 | Watson et al. | 166/236 |
| 2,104,339 | 1/1938 | Arutunoff | 166/105.1 |
| 2,907,351 | 10/1959 | Rohrback | 166/242 |
| 3,561,603 | 2/1971 | Salomon | 210/497 |
| 3,816,894 | 6/1974 | Howard et al. | 29/163.5 CW X |

FOREIGN PATENT DOCUMENTS

| | | | |
|---|---|---|---|
| 589,525 | 12/1959 | Canada | 210/460 |

*Primary Examiner*—Ernest R. Purser
*Attorney, Agent, or Firm*—R. A. Stoltz

[57] ABSTRACT

An erosion-resistant sand screen assembly is described for use in petroleum wells of the type in which sand tends to become entrained in the stream of petroleum entering the wellbore. The assembly is especially useful in cased holes in formations which consist of very find sand, such as have been encountered in the Gulf Coast region of the United States and off the east coast of Trinidad. The assembly uses a sleeve with an erosion-resistant wall at least one-fourth inch thick, positioned around the outside layer of wire screen. Preferably, the assembly has an outer surface of a resilient elastomeric material.

2 Claims, 4 Drawing Figures

WELL SCREEN WITH EROSION PROTECTION WALLS

BACKGROUND OF THE INVENTION

This invention relates to sand screens for petroleum wells, and especially to the protection of sand screens from erosion.

Oil and gas are produced from underground formations through wellbores drilled from the surface to the formation. Some oil and gas are contained in the pores of consolidated rocks. When this petroleum (oil, gas, or both) is produced through the wellbore, it is generally relatively free of sand. However, many oil and gas wells produce fluid from underground formations which are friable or unconsolidated; that is, the sand particles are not strongly attached to each other, and, when the petroleum containing fluid (possibly with substantial amounts of water) is produced, it tends to carry entrained sand with it. This sand can cause extremely serious damage to well equipment. In producing petroleum from such unconsolidated formations, some method should be provided to restrain the sand inflow into the well.

Various configurations of sand screens have been used. U.S. Pat. No. 3,712,373, issued to Bearden and Howard, on Jan. 23, 1973 (and U.S. Pat. No. 3,816,894, which is division of the aforementioned U.S. Pat. No. 3,712,373), describe multilayer (especially triple-layer) screens for use in petroleum wells in unconsolidated sand formations. The three-layer (or triple-wrap) configuration has been used extensively in fine sand formations. Unfortunately, however, erosion has caused extensive problems in these screens when used in high-production wells in the very fine sand formations. The erosion is particularly bad when the flow is concentrated in a relatively small region. This flow concentration is especially prevalent in cased holes where the flow is concentrated through the perforations. While production from the uncased section of a well (openhole) usually avoids the problem of excessively rapid erosion of screens due to flow concentrations, irregularities in the formations occasionally cause extreme concentrations in the flow, and thus the use of open-hole sections does not always eliminate the problem. In addition, a single cased hole can be used for pretroleum production from several different formations at different depths. Thus, the use of open holes in areas with multiple producing formations requires additional wells at considerable extra expense.

Gravel packs around the outside of screens have been used, but the gravel has not proved to be an entirely satisfactory erosion-preventive method in high-production wells and is often parted by the flow stream, leaving a hole through which the sand-laden fluid flows at high velocity. The gravel may also be vibrated by the flowing fluids and thereby erode the screen. Further, gravel packing is a time-consuming operation and represents considerable added expense. Typically, two or more days of expensive rig time are required for a conventional gravel pack.

Gravel packing was used with a single-wrap screen in various combinations in five wells of the Teak Field, located about 25 miles off the east coast of Trinidad. None of these combinations proved very satisfactory in the shallower, more loosely consolidated formations, and either very low flow rates or holes in the screen (resulting in sanding up of the wells) were encountered in all wells in these formations.

Triple-wrap screens were run in eight wells without gravel packing in the same formations. While such screens appeared to be working satisfactorily when first installed, holes were formed in the relatively thin wall (about one-eighth inch per layer) of the screen in a relatively short time. This problem was especially severe in the shallower horizons and one of the triple-wrap screens failed after only 21 days of production. For further details of this installation, reference is made to "A History of Sand Control in Amoco Trinidad's Offshore Teak Field," by Don J. Likwartz, presented at the 50th Annual Fall Meeting of the Society of Petroleum Engineers to AIME, in 1975 (Paper SPE 5657).

The erosion of the screens can result in considerable expense, including the costs associated with cleaning out sand-filled lines and patching (i.e., U.S. Pat. No. 3,482,629, issued to Suman on Dec. 9, 1969), or replacing screen assemblies, as well as repair to damaged surface equipment.

SUMMARY OF THE INVENTION

This invention concerns a sand screen assembly for oil and gas wells. The assembly has a heavy-walled, erosion-resistant deflector around the wire screen to deflect the stream of fluid entering the wellbore, thereby substantially reducing the erosion of the wire screen. The assembly comprises an inner section of perforated pipe, at least one layer of wire screen positioned around the pipe, and a stream-deflecting means having an erosion-resistant wall at least one-fourth inch thick positioned around the layer of wire screen. The stream of fluid entering the wellbore is deflected to prevent direct impingement on the layer of wire screen. Preferably, the outer surface of the stream-deflecting means is made of a resilient elastomeric material.

BRIEF DESCRIPTION OF THE DRAWINGS

The invention will be further described by reference to the following drawings in which.

DESCRIPTION OF THE PREFERRED EMBODIMENTS

Figure 1:
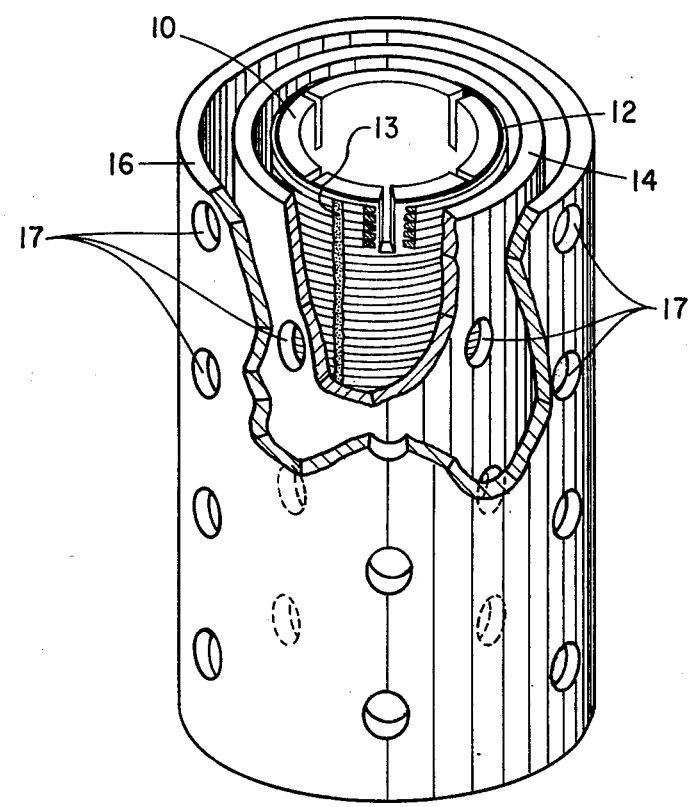
FIG. 1 is a perspective view of a portion of the length of an assembly with two stream-deflecting sleeves and with both of the sleeves partially cut away.

FIG. 1 illustrates an embodiment of this invention where two concentric sleeves with offset openings are positioned outside the screen with the openings located in such a manner as to assure deflection (to prevent direct impingement on the layer of wire screen) of the stream of petroleum entering the wellbore. The inner section of pipe 10 is surrounded by at least one layer of wire screen. Here, a single layer 12 of wire screen (with a weld bead 13 for structural purposes) is shown. The screen-deflecting means comprises an inner sleeve 14 positioned around the layer of wire screen 12 and an outer sleeve 16 positioned around and spaced from the inner sleeve 14. Both sleeves have a plurality of openings 17, with the openings 17 in said inner sleeve 14 being offset from the openings 17 in the outer sleeve 16, such that the stream of fluid is deflected and the stream of fluid entering the wellbore is prevented from directly impinging upon the layer of wire screen 12. Both the inner sleeve 14 and the outer sleeve 16 are at least one-fourth inch thick, such that an open hole (or a cased hole with an opening 17 in the outer sleeve 16 lined up with a penetration in the casing) there is at least one-fourth inch of material between the stream of fluid entering the wellbore and the layer of wire screen 12. The relative positions of the elements are shown fixed by longitudinal spacers 18, but other spacer configuration, i.e., helical, could be used.

Figure 2:
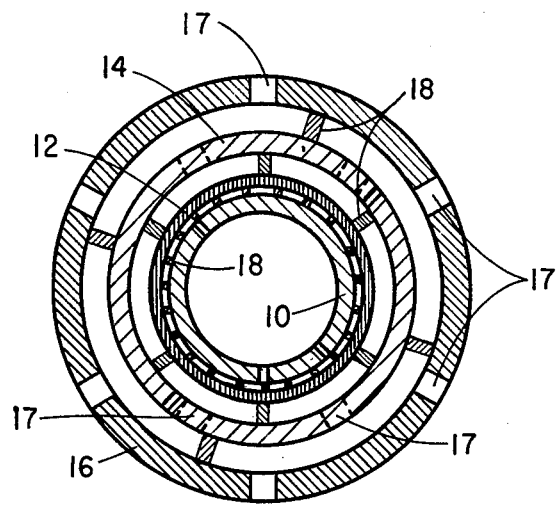
FIG. 2 is a cross section of the screen assembly of FIG. 1, perpendicular to the longitudinal axis.

FIG. 2 is a cross section of the screen assembly of FIG. 1, taken perpendicular to the longitudinal axis and shows a section taken through openings 17 in the outer sleeve 16. The relative position of openings 17 in the inner sleeve 14 are shown by dotted lines. While the screen is shown as a single layer 12, the screen and the pipe could be a multilayer well screen assembly, such as described in the aforementioned multilayer screen U.S. Pat. No. 3,712,373. The inner section of pipe 10 will generally have a plurality of perforations in it and can, for example, be slotted generally in the manner described in the aforementioned multilayer screen patent.

The material for the inner sleeve 14 and the outer sleeve 16 can be of a material such as stainless steel (in which case, the increased erosion resistance is generally provided by the increased thickness of the wall), or can be of an elastomeric material, such as neoprene (in which case, the resistance to erosion is provided, at least in part by the resilience of the material). If desired, each of the sleeves could alternatively be laminated with the outer portion being a resilient elastomeric material and the inner portion of each sleeve being of rigid metal.

Figure 3:
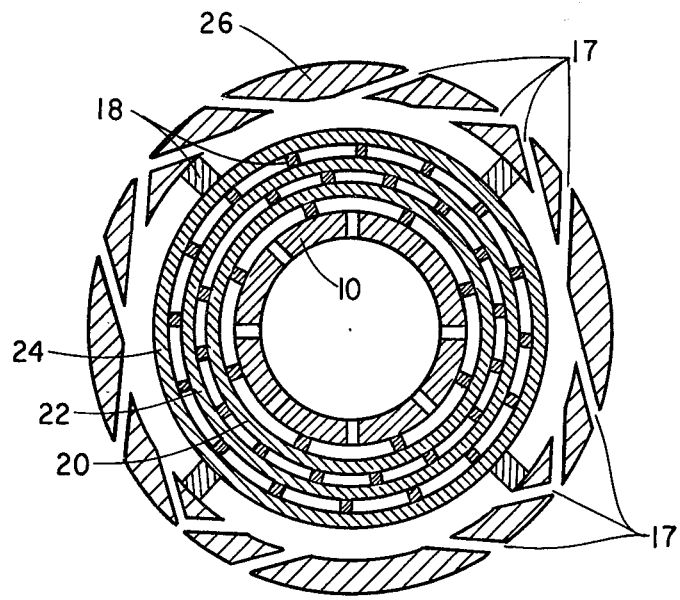
FIG. 3 is a cross section taken perpendicular to the longitudinal axis of an assembly having a triple-wrap screen wire with a single stream-deflecting sleeve.

FIG. 3 shows a cross section taken perpendicular to the longitudinal axis of an assembly having a single deflector sleeve. Although a single layer of screen, such as shown in FIGS. 1 and 2, could be used, a triple-wrap screen is shown with an inner screen layer 20, an intermediate screen layer 22, and an outer screen layer 24. The openings 17 in the deflector sleeve 26 are positioned such that direct impingement on the screen 24 by streams of fluid entering the wellbore is prevented. The sleeve openings 17 are positioned generally tangentially to the inner diameter of the sleeve 26 and this provides a flow axis sufficiently offset from a radial direction to prevent direct inpingement of the stream of petroleum liquids or gases entering the wellbore. The wall thickness is at least one-quarter inch, and greater wall thicknesses (up to that limited by the ID of the casing) can be used. While thinner than a one-fourth inch wall could theoretically be used, if the wall was of extremely hard material, e.g., tungsten carbide, the cost of fabrication of such materials is so high that their use is impractical.

Practical sleeve configurations can be made, however, using a one-fourth inch steel wall with a hardened outer surface. The hardened outer surface can be provided, for example, by case hardening or by a coating of a material such as tungsten carbide.

The openings 17 in the sleeve 26 could be made in a number of manners, including drilling or milling of slots. Openings 17 in the sleeve in FIG. 3 are positioned such that they can be fabricated by means of a series of sawcuts (each preferably at least 3/32-inch wide), thereby reducing fabrication cost.

An indirect flow path can be provided by two layers of spiral-wrapped, stream-deflecting material where the center-to-center distances between adjacent wraps within each layer are the same in both layers and where the wraps are positioned such that the openings are always offset. To effectively resist erosion, each stream-deflecting spiral-wrap is at least one-quarter inch thick. It will be noted that triple-wrap screens are also spiral-wrapped, but, while the openings are offset over much of the surface, these openings are not offset in other places. This is the result of the wire center-to-center dimension being different in the different layers of the triple-wrap screen.

In all configurations, the smallest dimension of the openings 17 in the stream-deflecting means is intended to be larger than the sand particles such that substantially all of the sand particles in the particular formation could pass through the openings 17. Preferably, this dimension should be at least 3/32 inch to prevent excessive resistance to the flow of petroleum.

A resilient elastomeric material is preferred for the outer surfaces of the assembly, as such materials resist erosion generally better than materials such as stainless steel. Material such as neoprene or silicone rubber can be used to resist the downhole conditions, including the elevated downhole temperatures often encountered, as well as being resistant to oil. Many other elastomeric materials that are resistant to the downhole environment in oil and gas wells are available and could be used. Rubber is generally unsatisfactory as it is excessively swelled when contacted by oil.

Figure 4:
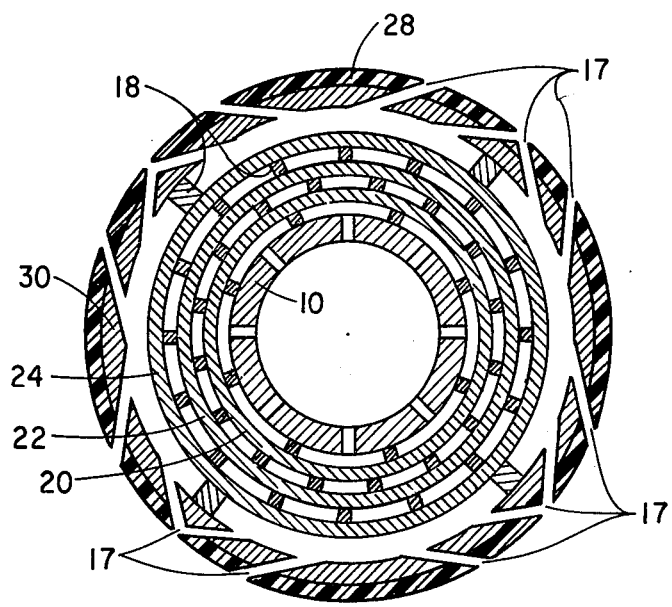
FIG. 4 is a cross section similar to FIG. 3, but where the sleeve is laminated with the outer portion of a resilient elastomeric material.

FIG. 4 shows a configuration generally similar to that in FIG. 3 with the exception that a laminated stream-deflecting means is used. The outer portion 28 is of a resilient elastomeric material, and the inner portion 30 is of rigid metal. In this manner, a relatively soft, resilient, elastomeric material 28 can be used while kept in place by the rigid metal 30.

The invention is not to be construed as limited to the particular forms disclosed herein, since these are to be regarded as illustrative rather than restrictive. The invention is intended to cover all configurations which do not depart from the spirit and scope of the invention.

I claim:

1. A sand screening assembly resistant to erosion when used in oil and gas wells in which sand tends to be entrained in the stream of fluid entering the wellbore, said assembly comprising:
   a. an inner section of perforated pipe;
   b. at least one layer of wire screen positioned around said pipe; and
   c. a stream-deflecting means having an erosion-resistant wall at least one-fourth inch thick positioned around said layer of wire screen for deflecting said stream of fluid to prevent direct impingement of said stream on said layer of wire screen, wherein said stream-deflecting means comprises an outer portion of resilient, petroleum-resistant, elastromeric material, and an inner portion of rigid metal.

2. A sand screening assembly resistant to erosion when used in oil and gas wells in which sand tends to be entrained in the stream of fluid entering the wellbore, said assembly comprising:
   a. an inner section of perforated pipe;
   b. at least one layer of wire screen positioned around said pipe; and
   c. a stream-deflecting means having an erosion-resistant wall at least one-fourth inch thick positioned around said layer of wire screen for deflecting said stream of fluid to prevent direct impingement of said stream on said layer of wire screen, wherein said stream-deflecting means comprises an inner sleeve positioned around said layer of wire screen and an outer sleeve positioned around and spaced from said inner sleeve, each sleeve having a plurality of openings, with said openings in said inner sleeve being offset from said openings in said outer sleeve, such that said stream of fluid is deflected.

* * * * *